United States Patent
Eason et al.

(10) Patent No.: US 11,764,635 B2
(45) Date of Patent: Sep. 19, 2023

(54) SHAFT-MOUNTED SLINGER FOR ELECTRIC MOTOR

(71) Applicant: Nidec Motor Corporation, St. Louis, MO (US)

(72) Inventors: Richard L. Eason, Ballwin, MO (US); Chetan O. Modi, Valley Park, MO (US); Kevin L. West, Belleville, IL (US)

(73) Assignee: Nidec Motor Corporation, St. Louis, MO (US)

( * ) Notice: Subject to any disclaimer, the term of this patent is extended or adjusted under 35 U.S.C. 154(b) by 90 days.

(21) Appl. No.: 17/560,212

(22) Filed: Dec. 22, 2021

(65) Prior Publication Data

US 2022/0115929 A1    Apr. 14, 2022

Related U.S. Application Data

(63) Continuation of application No. 16/220,605, filed on Dec. 14, 2018, now Pat. No. 11,218,048.

(51) Int. Cl.
| | |
|---|---|
| *H02K 5/10* | (2006.01) |
| *H02K 5/15* | (2006.01) |
| *F04D 29/70* | (2006.01) |
| *H02K 5/12* | (2006.01) |
| *F01D 5/14* | (2006.01) |

(52) U.S. Cl.
CPC .................. *H02K 5/10* (2013.01); *H02K 5/15* (2013.01); *F01D 5/143* (2013.01); *F04D 29/703* (2013.01); *H02K 5/12* (2013.01); *H02K 2205/09* (2013.01)

(58) Field of Classification Search
CPC ... F01D 5/143; F04D 29/703; H02K 2205/09; H02K 5/10; H02K 5/12; H02K 5/15; H02K 5/1732; H02K 9/06; H02K 9/14
See application file for complete search history.

(56) References Cited

U.S. PATENT DOCUMENTS

| | | | | |
|---|---|---|---|---|
| 2,967,959 | A * | 1/1961 | Waters ...................... | H02K 9/06 310/43 |
| 9,219,396 | B2 * | 12/2015 | Watanabe ................. | H02K 9/06 |
| 11,264,868 | B2 * | 3/2022 | Eason ..................... | H02K 11/33 |
| 2011/0074254 | A1 * | 3/2011 | Critchley ............... | H02K 11/33 310/60 R |

* cited by examiner

*Primary Examiner* — Naishadh N Desai
(74) *Attorney, Agent, or Firm* — Hovey Williams LLP

(57) ABSTRACT

A slinger for an electric motor broadly includes a hub and a wheel. The motor includes a housing in which a stator and rotor are at least partly housed. The motor also includes a rotatable output shaft projecting upwardly through a shaft opening in the housing. The hub is fixedly attachable to the output shaft of the motor so that the slinger rotates with the output shaft. The wheel is configured to divert liquid radially away from the shaft opening. The wheel includes a wheel plate and a plurality of radially extending blades cooperatively forming a series of passages extending radially outward relative to the shaft opening, when the hub is attached to the output shaft. The wheel plate is supported by the hub so as to be positioned above the housing when the hub is attached to the output shaft. The blades present radially inboard ends intersecting the hub.

20 Claims, 9 Drawing Sheets

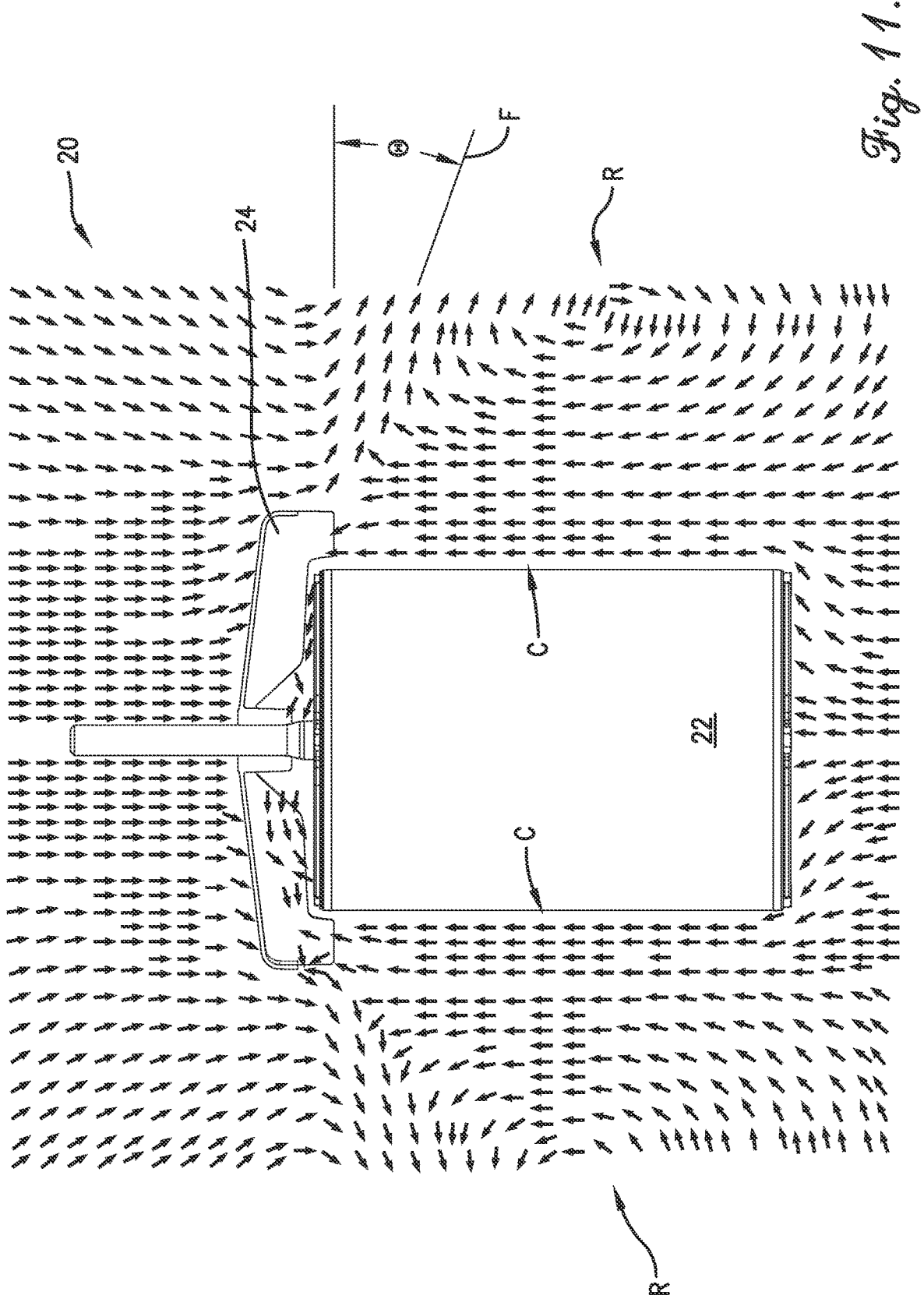

SHAFT-MOUNTED SLINGER FOR ELECTRIC MOTOR

CROSS-REFERENCE TO RELATED APPLICATIONS

This is a continuation of prior application Ser. No. 16/220,605, filed Dec. 14, 2018, entitled SHAFT-MOUNTED SLINGER FOR ELECTRIC MOTOR, which is hereby incorporated in its entirety by reference herein.

BACKGROUND

1. Field

The present invention relates generally to electric motors. More specifically, embodiments of the present invention concern a slinger mounted on the output shaft of an electric motor to divert liquid away from the motor chamber.

2. Discussion of Prior Art

It is well known by those of skill in the art that electric motors are often installed in wet or humid environments, which can lead to liquid ingress inside the motor. Electric motors often fail when liquid migrates into shaft bearings or other components within the motor chamber. In some installations, the motor is vertically oriented so that an exposed part of the motor output shaft extends through an upper endshield and above the motor housing. For this vertical motor orientation, it is known that liquid can collect along the upper housing component (e.g., endshield), particularly along the shaft opening formed by the upper housing component.

To restrict liquid ingress for vertical motor installations, electric motors are often provided with a slinger mounted on the output shaft. Conventional slingers, such as those depicted in FIGS. 1-4, include a solid plate that generally covers the upper endshield and a series of blades below the plate and adjacent the endshield. Prior art slingers spin with the output shaft to move liquids radially away from the output shaft.

However, prior art slingers are deficient and have various problems. For instance, conventional slingers move liquids inefficiently away from the shaft opening. Known slingers are also prone to premature failure (e.g., due to excessive flexing or vibration of the slinger).

SUMMARY

The following brief summary is provided to indicate the nature of the subject matter disclosed herein. While certain aspects of the present invention are described below, the summary is not intended to limit the scope of the present invention.

Embodiments of the present invention provide a slinger that does not suffer from the problems and limitations of the prior art slingers set forth above.

A first aspect of the present invention concerns an electric motor that broadly includes a stator, a rotor, a housing, a rotatable output shaft, and a slinger. The rotor is rotatable relative to the stator. The stator and rotor are at least partly housed in the housing. The housing presents a shaft opening. The output shaft projects outwardly through the shaft opening and is associated with the rotor for rotational movement therewith, with the motor being positionable so that the output shaft extends upwardly relative to the shaft opening. The slinger is fixed relative to the output shaft outside the housing, with the slinger being rotatable with the output shaft to divert liquid radially away from the output shaft and the shaft opening. The slinger includes a hub adjacent the output shaft. The slinger also includes a wheel. The wheel includes a wheel plate and a plurality of radially extending blades cooperatively forming a series of passages extending radially outward relative to the shaft opening. The wheel plate is supported by the hub and is positioned above the housing when the motor is positioned so that the output shaft extends upwardly relative to the shaft opening. The blades present radially inboard ends intersecting the hub.

A second aspect of the present invention concerns a slinger for an electric motor. The motor includes a housing in which a stator and rotor are at least partly housed. The motor also includes a rotatable output shaft projecting upwardly through a shaft opening in the housing, with the output shaft being associated with the rotor for rotational movement therewith. The slinger broadly includes a hub and a wheel. The hub is fixedly attachable to the output shaft so that the slinger rotates with the output shaft. The wheel is configured to divert liquid radially away from the shaft opening. The wheel includes a wheel plate and a plurality of radially extending blades cooperatively forming a series of passages extending radially outward relative to the shaft opening, when the hub is attached to the output shaft. The wheel plate is supported by the hub so as to be positioned above the housing when the hub is attached to the output shaft. The blades present radially inboard ends intersecting the hub.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 11 is a side elevation of the electric motor assembly shown in FIGS. 5-7, showing fluid flow induced by rotation of the slinger.

Figure 2:
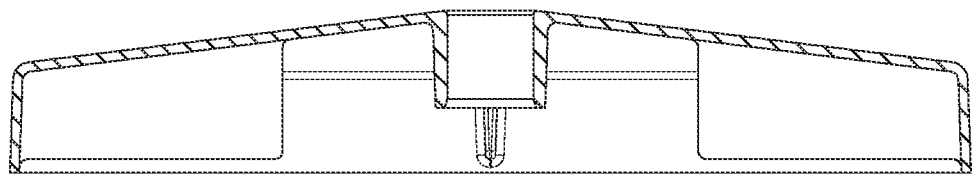
FIG. 2 is a cross section of the prior art slinger shown in FIG. 1.
Figure 1:
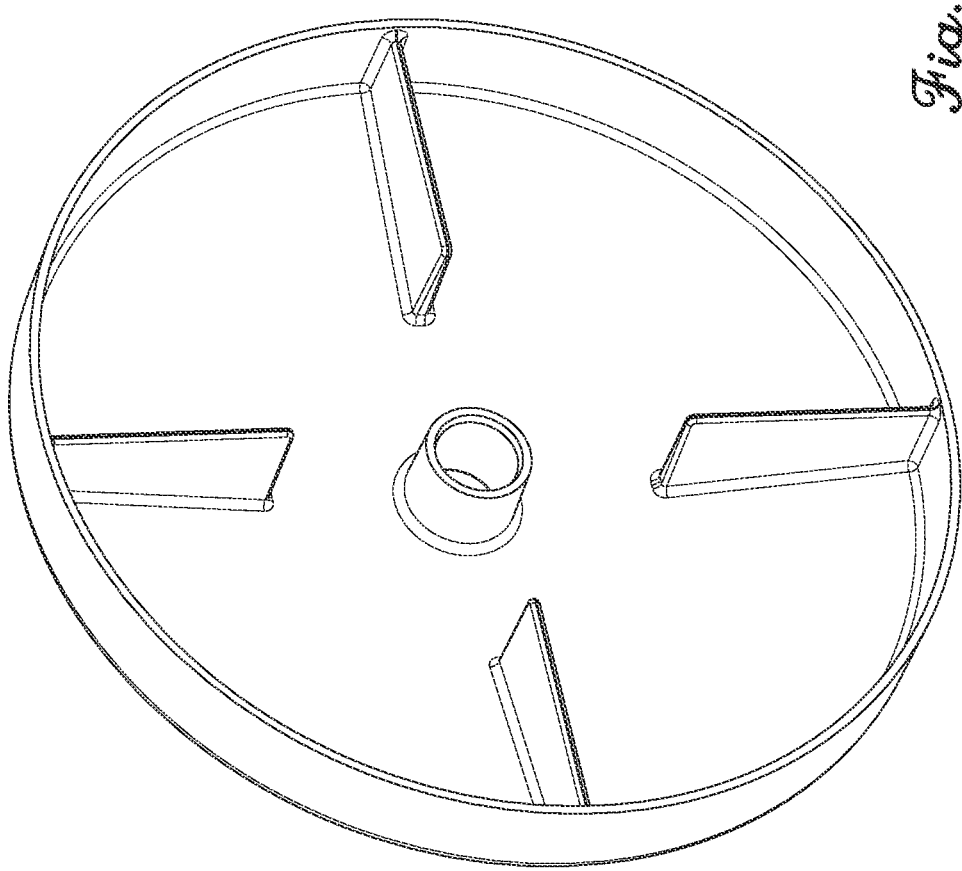
FIG. 1 is a perspective of a prior art slinger.
Figure 4:
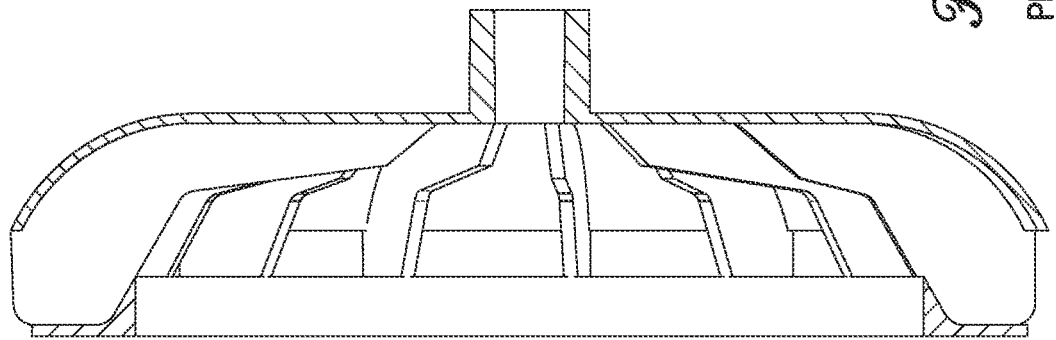
FIG. 4 is a cross section of the second prior art slinger shown in FIG. 3.
Figure 3:
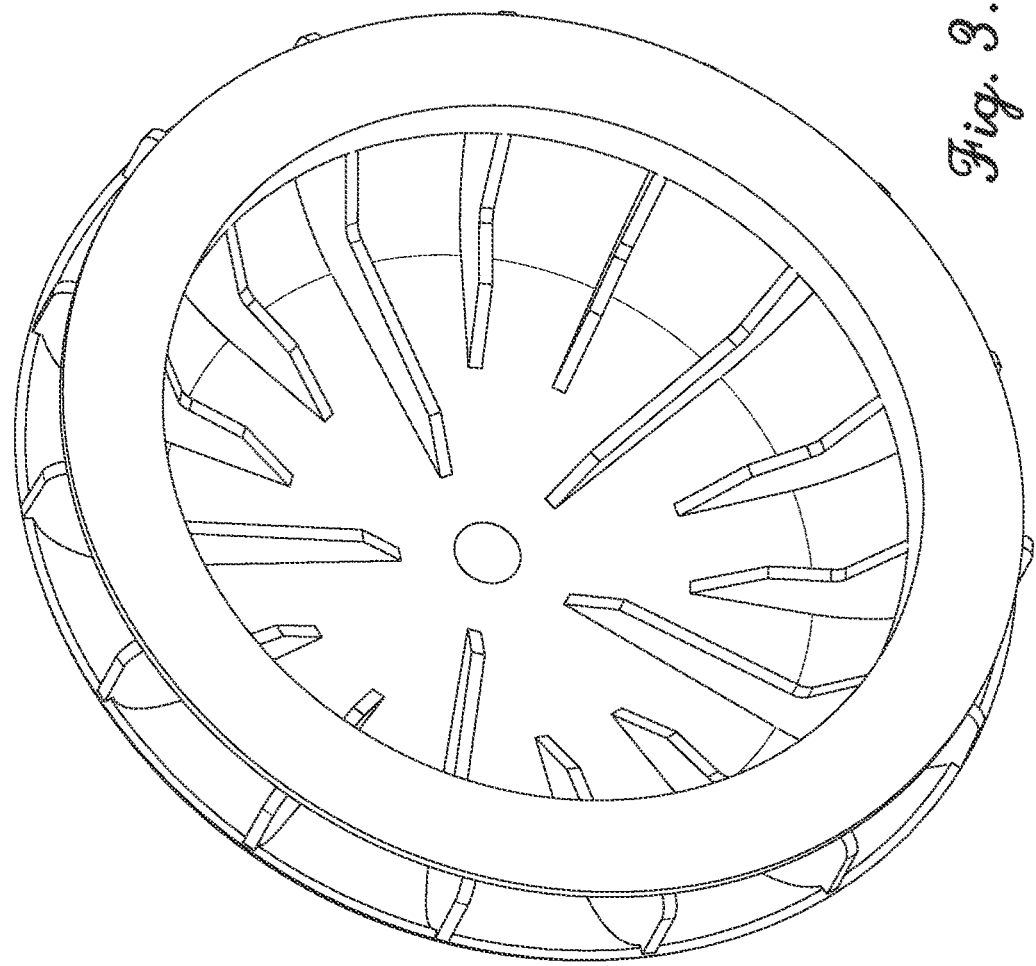
FIG. 3 is a perspective of a second prior art slinger.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Figure 5:
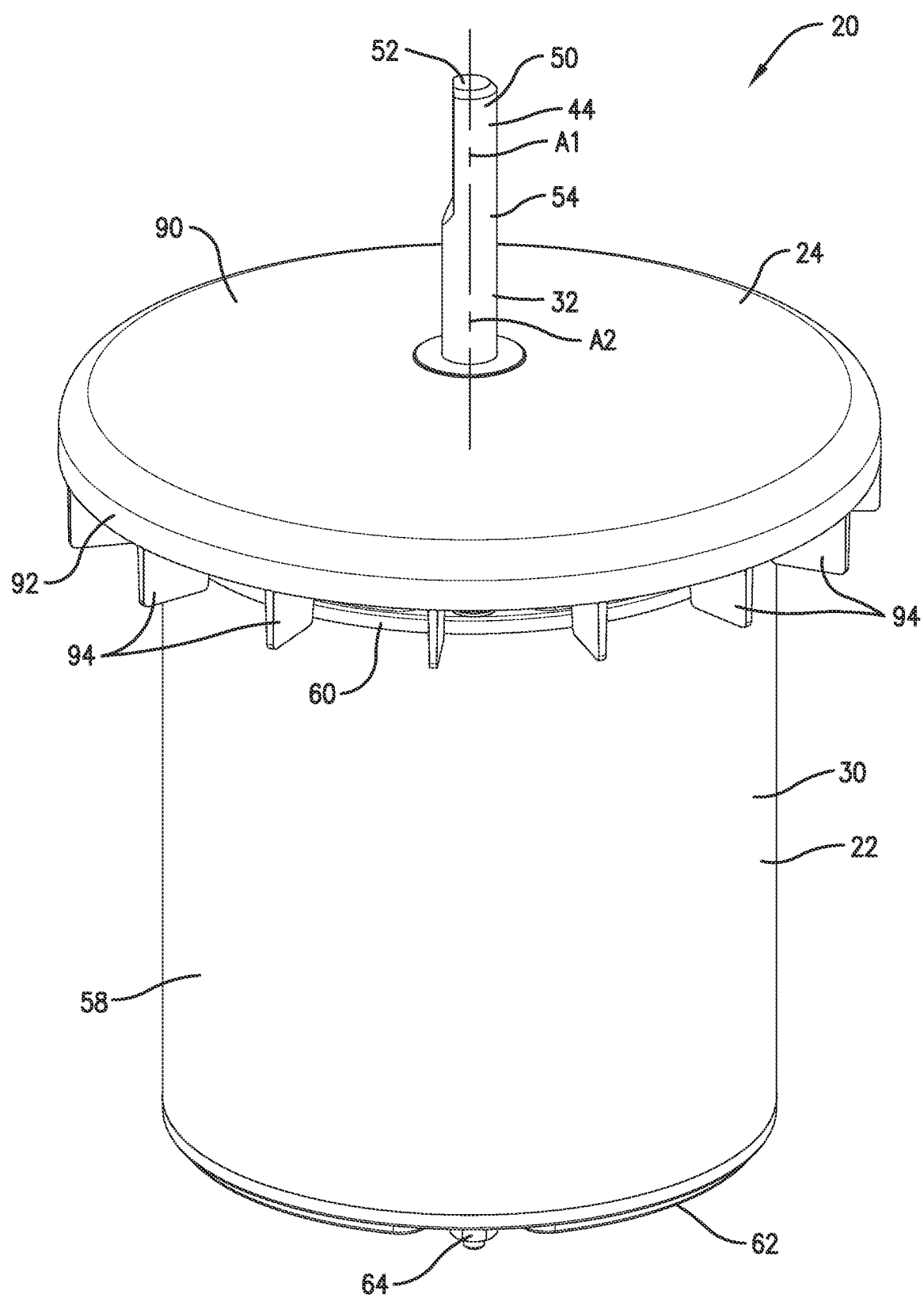
FIG. 5 is an upper perspective of an electric motor assembly constructed in accordance with a preferred embodiment of the present invention, with the assembly including an electric motor and a slinger, where the electric motor includes a housing and an output shaft rotatably supported by the housing, and with the slinger mounted on the shaft.
Figure 6:
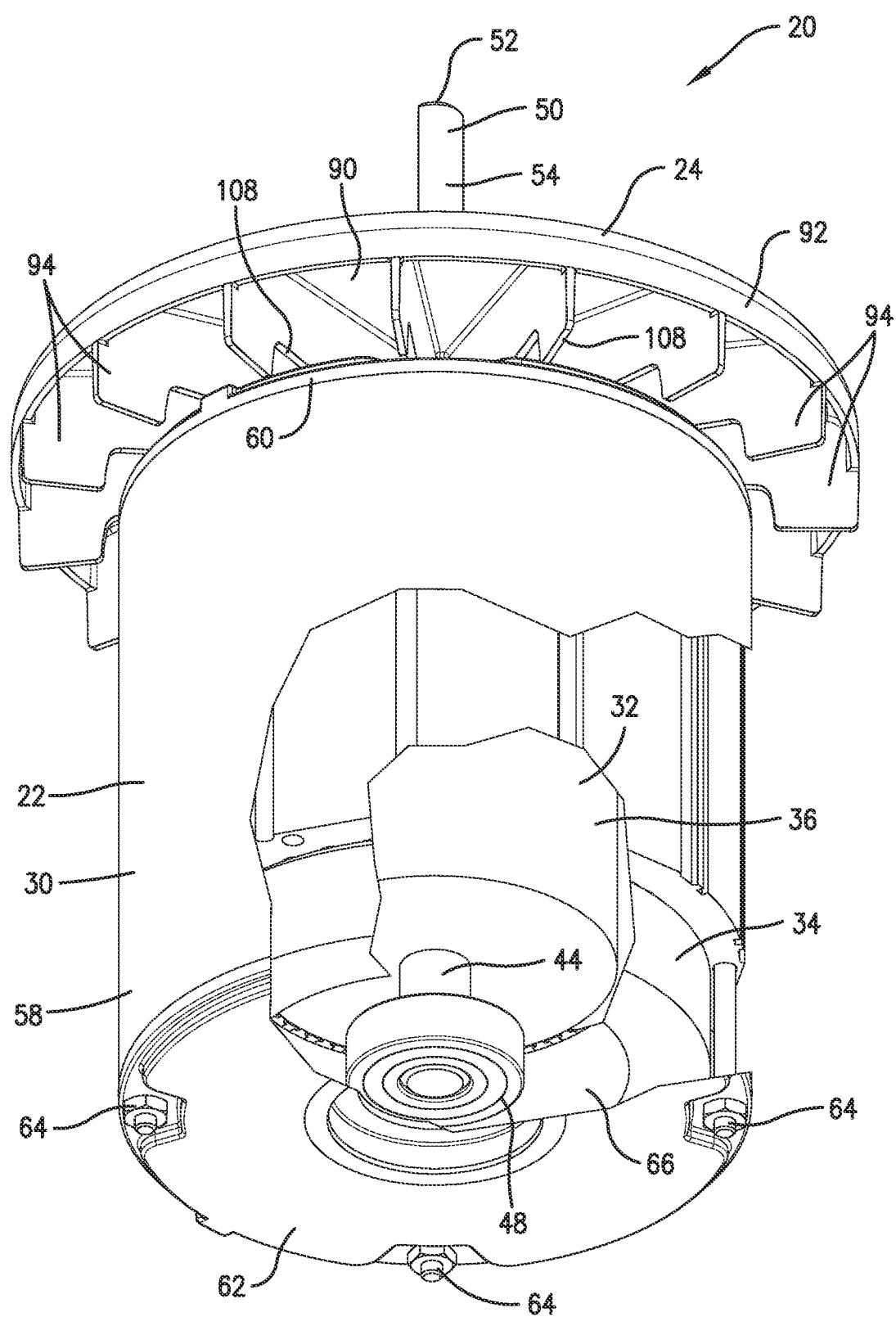
FIG. 6 is a fragmentary lower perspective of the electric motor assembly shown in FIG. 5, showing part of the motor removed to depict a stator and rotor operably mounted within the housing, with the rotor being supported by bearings.
Figure 7:
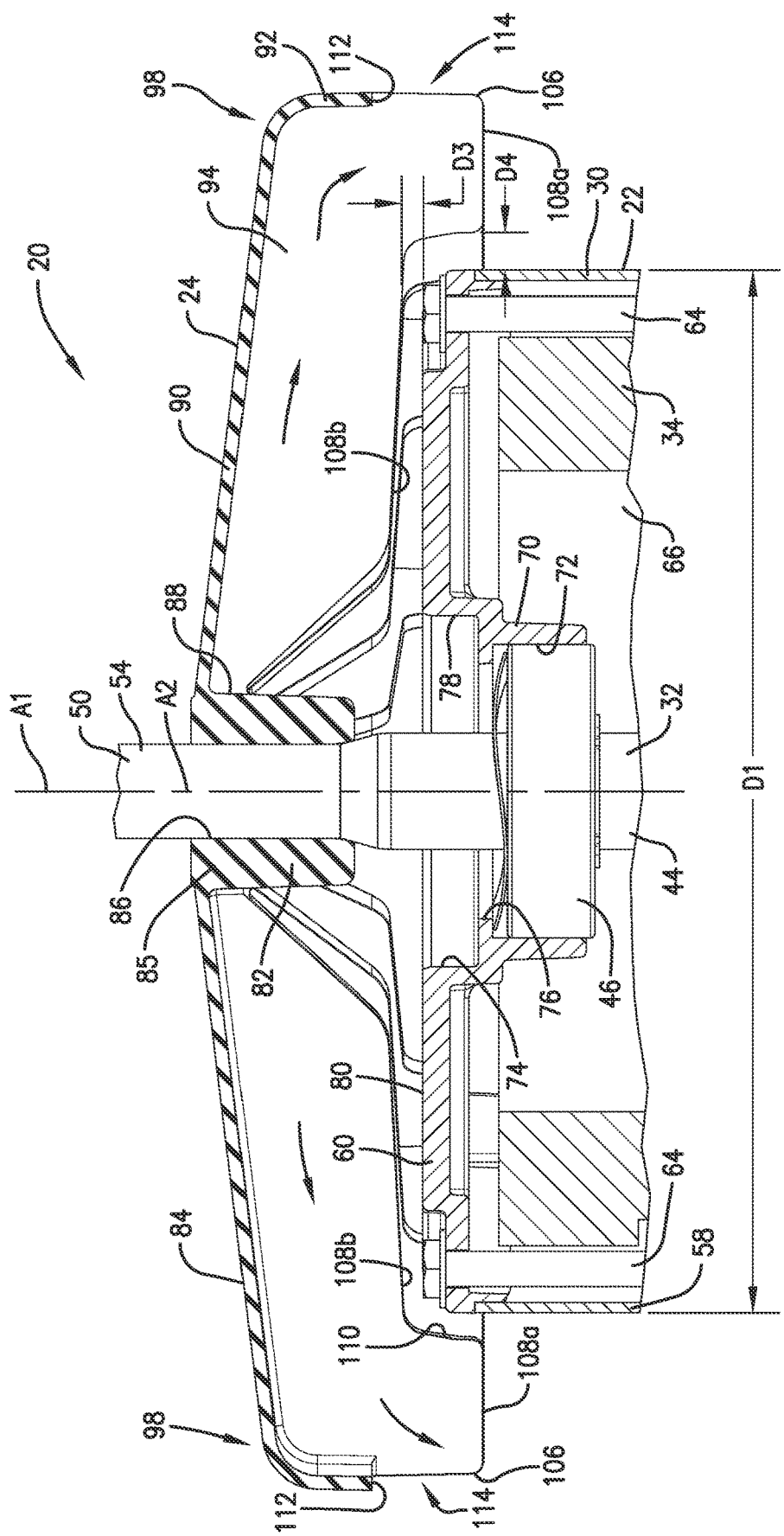
FIG. 7 is a fragmentary cross section of the electric motor assembly shown in FIGS. 5 and 6, showing a hub and wheel of the slinger, with the output shaft receiving the hub and rotatably supported adjacent the slinger by one of the bearings.

Turning to FIGS. 5-7, an electric motor assembly 20 is constructed in accordance with a preferred embodiment of the present invention. The motor assembly 20 is particularly configured for extended service in humid or wet environments. The motor assembly 20 broadly includes an electric motor 22 and a slinger 24.

In the usual manner, the motor assembly 20 is mounted for operation using a motor support structure (not shown). The support structure serves to support the weight of the motor assembly 20. At the same time, the motor support structure can minimize transmission of external loads and vibration between the motor assembly and other structural components. For instance, the support structure can include one or more elastomeric elements (not shown) to isolate the motor assembly from various loads. The motor 22 includes a housing 30 configured to be removably attached to the support structure with fasteners (also not shown).

The principles of the present invention are also applicable where one or more various other types of motor support structures are used to support the motor. For instance, the support structure could have various alternative isolation structures to isolate the motor from loads (or no isolation mechanism at all).

The electric motor 22 is configured for use in any suitable environment, such as a powered machine (not shown). The motor 22 broadly includes the housing 30, a rotor 32, and a stator 34 (see FIG. 6). The rotor 32 is preferably rotatable about a rotational shaft axis A1 (see FIGS. 5 and 7). In preferred embodiments, the stator 34 at least substantially circumscribes the rotor 32, such that the motor 22 is an inner rotor motor. It is permissible according to some aspects of the present invention, however, for the motor to be an outer rotor motor.

The rotor 32 preferably includes a rotor core 36, a plurality of magnets (not shown), and a shaft 44 defining the shaft axis A1 for the rotor 32. The rotor core 36 and magnets are generally located within the housing 30. The shaft 44 is rotatably supported relative to the motor housing 30 to rotate about the shaft axis A1. More specifically, the shaft 44 is rotatably supported by a upper bearing 46 (see FIG. 7) and a lower bearing 48 (see FIG. 6) of the motor 22. In the preferred embodiment, the rotor weight is generally shared evenly by the upper bearing 46 and the lower bearing 48.

The shaft 44 preferably includes an exposed portion 50 that is exposed relative to the motor housing 30 and engages the slinger 24 (see FIGS. 5-7). In other words, the exposed shaft portion 50 is outside the housing 30. In the illustrated embodiment, the exposed portion 50 is preferably cantilevered relative to the motor housing 30 such that a free end 52 of the shaft 44 is spaced from the housing 30 (see FIGS. 5 and 6). However, for some aspects of the present invention, the shaft could have an exposed portion alternatively located along the length of the shaft (e.g., where the exposed portion is spaced between the ends of the shaft and, more optionally, between the bearing supports such that the exposed portion is along a non-cantilevered portion of the shaft). The depicted shaft 44 presents a continuous outer shaft surface 54 to receive the slinger 24 (see FIGS. 5 and 6). Preferably, the shaft 44 of the rotor 32 defines the output shaft of the motor 22, which is drivingly connected to the mechanism or machine (neither shown) powered by the motor 22. It will be appreciated, however, that certain aspects of the present invention contemplate the motor output shaft not being the rotor shaft. For example, the motor may alternatively be provided with a transmission (e.g., a gear drive) between the rotor shaft and output shaft, with the shafts being drivingly connected but otherwise discrete and spaced apart. It is also possible for certain inventive aspects for the slinger to be mounted to a motor shaft that is not directly connected to the mechanism or machine powered by the motor.

The housing 30 preferably includes a shell 58, an upper endshield 60, a lower endshield 62, and fasteners 64 (see FIGS. 5-7). The housing 30 also presents a housing diameter dimension D1 (see FIG. 7). The shell 58 and the endshields 60 and 62 preferably present an internal motor chamber 66 that at least substantially receives the stator 34 and the rotor 32.

In a preferred embodiment, the shell 58 extends generally circumferentially about the stator 34. It is permissible according to some aspects of the present invention, however, for the shell to extend in such a manner as to provide one or more flat sides, in contrast to the preferred generally cylindrical form, or to be otherwise alternatively shaped.

The upper endshield 60 preferably supports the upper bearing 46, and the lower endshield 62 preferably supports the lower bearing 48. The depicted endshields 60 and 62 are preferably secured to the shell 58 by means of the fasteners 64. However, it is within the ambit of the present invention where the housing has an alternative shell and/or alternative endshields. Furthermore, the shell and endshields could be alternatively secured to one another.

In the illustrated embodiment, the upper endshield 60 includes a bearing housing 70 that presents a bearing pocket 72 receiving the upper bearing 46 (see FIG. 7). The upper endshield 60 also presents relief openings 74, 76 (see FIG. 7). The bearing pocket 72 and the openings 74, 76 cooperatively provide a shaft opening 78 that permits the shaft 44 to extend therethrough from the motor chamber 66 to outside the housing 30 (see FIG. 7). The endshield 60 also presents an end face 80 that extends about the shaft opening 78.

Again, the upper bearing 46 and the lower bearing 48 preferably cooperatively rotatably support the shaft 44. However, alternative or additional bearings, supports, or shaft supports may be provided without departing from the scope of the present invention.

Although the illustrated slinger 24 is preferably used with the depicted motor 22, the slinger 24 could be used in connection with a wide range of motor configurations. For example, the shaft 44 of the rotor 32 preferably extends into and out of the housing 30 so that the slinger 24 is mounted directly on the shaft 44 and is thereby driven directly by the rotor 32. However, in alternative embodiments, the slinger 24 could be powered by the rotor without being mounted on the rotor shaft.

Again, it will be appreciated that the slinger and rotor shaft could be interconnected by a transmission (not shown). In such alternative embodiments, the transmission could provide a transmission output shaft separate from the rotor shaft, where the slinger is mounted on the transmission output shaft.

Turning to FIGS. 6-11, the depicted slinger 24 is configured to rotate with the shaft 44 to divert liquid away from the shaft opening 78. When rotating with the shaft 44, the slinger 24 generally directs liquids in a radially outward direction (see FIG. 11). In this manner, the slinger 24 operates to restrict liquid from collecting in or adjacent the shaft opening 78 and thereby restricts liquid from migrating into the upper bearing 46, the bearing pocket 72, and/or the motor chamber 66.

Figure 8:
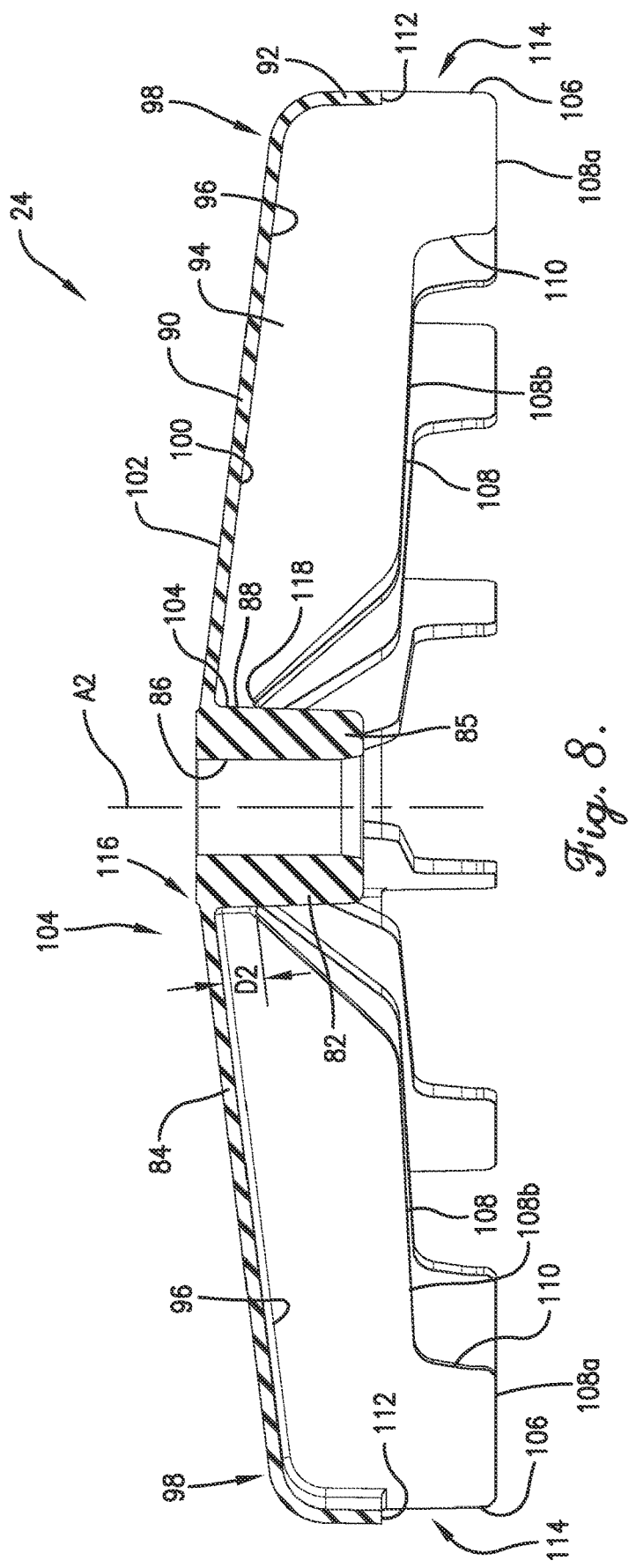
FIG. 8 is a fragmentary cross section of the slinger shown in FIGS. 5-7.

The slinger 24 preferably includes a hub 82 and a wheel 84 and presents a slinger axis A2 about which the slinger 24 rotates (see FIGS. 7 and 8). It will be appreciated that the slinger axis A2 and the shaft axis A1 are substantially coaxial in the illustrated embodiment. In the usual manner, the hub 82 presents a shaft hole 86 receiving the exposed portion 50 of the shaft 44 when the slinger 24 is mounted on the shaft 44.

The illustrated slinger 24 is fixed relative to the shaft 44 outside the housing 30 and is rotatable with the shaft 44 to divert liquid radially away from the shaft opening 78. Most preferably, the slinger 24 is fixedly attached directly to the shaft 44. Again, it is within the scope of the present invention where the slinger 24 is mounted on an output shaft other than the rotor shaft (e.g., a transmission output shaft). In such an alternative embodiment, it will be understood that the slinger axis and the rotor shaft axis could be coaxial or axially offset from one another (e.g., depending on the configuration of the transmission).

The illustrated hub 82 comprises a sleeve 85 that defines the shaft hole 86. Preferably, the shaft hole 86 extends continuously through the sleeve 85 and is defined by a smooth bore. In the preferred embodiment, the shaft hole 86 is sized and configured so that the shaft 44 is snugly received in the shaft hole 86. In the depicted embodiment, the slinger 24 is preferably frictionally engaged with the shaft 44 so as to be fixedly attached thereto (see FIG. 7). Furthermore, the shaft 44 projects outward in opposite directions relative to the sleeve 85 of hub 82.

However, it is within the scope of certain aspects of the present invention for the hub to be alternatively configured for driving attachment to the output shaft. For instance, although the illustrated sleeve provides a smooth bore, the sleeve could have a profile shape that is keyed, splined, or otherwise has a non-circular shape for mating with a corresponding shape of the output shaft.

In various alternative embodiments, the hub sleeve could be alternatively fixed to the output shaft, whether or not the output shaft extends entirely through the hub. For instance, the sleeve could be secured to the output shaft with one or more fasteners (e.g., a set screw, cotter pin, etc.).

Also in alternative embodiments, the hub could be configured so that the output shaft extends only partly through the hub or does not project from both ends of the hub.

Figure 10:
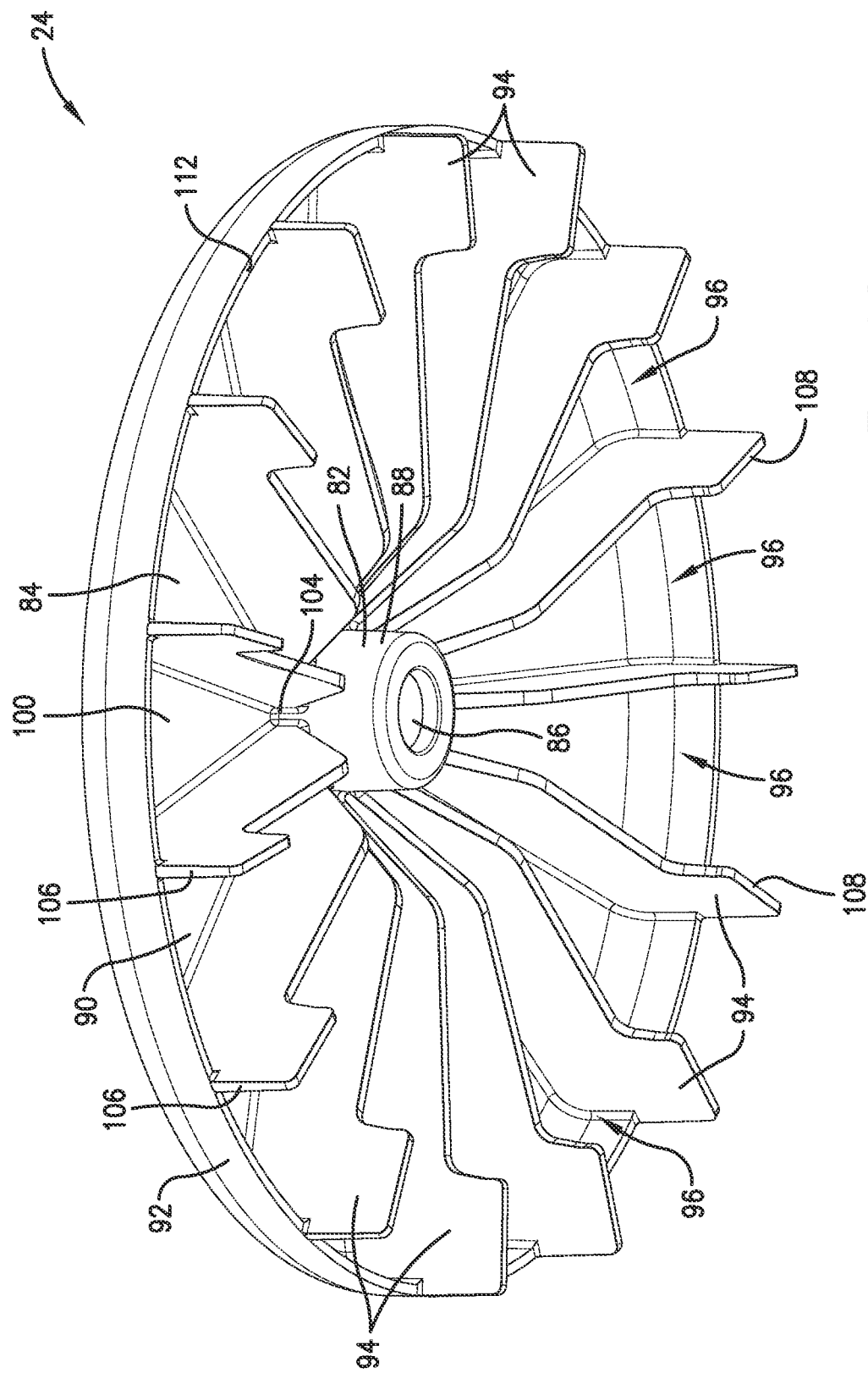
FIG. 10 is a lower perspective of the slinger shown in FIGS. 5-9.

The sleeve 85 also presents an outer surface 88 (see FIGS. 8 and 10). As will be described below, the blades present radially inboard ends that intersect the hub and project from the outer surface 88.

The illustrated wheel 84 cooperates with the hub 82 to divert liquid radially away from the shaft opening 78 and preferably includes a wheel plate 90, a circumferential skirt 92, and a plurality of radially extending blades 94. Preferably, the wheel plate 90, skirt 92, and blades 94 cooperatively form a series of passages 96 (see FIGS. 8 and 10) extending radially outward relative to the hub 82 (and relative to the shaft opening 78).

The wheel plate 90 is supported by the hub 82 and located above the housing 30 when the motor 22 is secured for operation so that the shaft 44 extends upwardly relative to the shaft opening 78. The wheel plate 90 of the illustrated embodiment is preferably continuous and extends to an outer plate margin 98 (see FIGS. 7-9). The outer plate margin 98 extends circumferentially so that the wheel plate 90 is generally circular in shape. The depicted wheel plate 90 has a slightly conical shape.

For some aspects of the present invention, the wheel plate 90 could be alternatively constructed (e.g., where the wheel plate 90 is not continuous). For instance, the wheel plate 90 could present one or more openings (e.g., to facilitate radially outward diversion of liquid). The depicted wheel plate 90 is fixed to the hub 82 and is preferably positioned so that the center of the outer plate margin 98 corresponds to the slinger axis A2. Those of skill in the art will also appreciate that the wheel plate could be alternatively shaped without departing from the principles of the present invention. For example, instead of having a conical shape, the wheel plate could have a substantially flat shape with opposite wheel plate surfaces that are planar.

In the depicted embodiment, the skirt 92 is configured to guide liquid within the passages 96 and restrict liquid flow out of the passages 96. The skirt 92 preferably projects axially from the outer plate margin 98 of the wheel plate in an axial direction toward the housing 30. The illustrated skirt 92 has an endless construction and interconnects outboard ends of the blades 94. As used herein, the term "endless construction" refers to the skirt 92 as extending continuously and endlessly in a circumferential direction.

As described below, the skirt 92 is preferably configured to partly cover the outboard ends of the blades 94. It will be appreciated that the skirt could be alternatively configured without departing from the scope of the present invention. For example, the skirt could be discontinuous such that circumferential spaces are defined between sections of the skirt. For some aspects of the present invention, the skirt could extend axially to substantially cover the entire outboard ends of the blades. In other alternative embodiments, the slinger could be devoid of a skirt.

Figure 9:
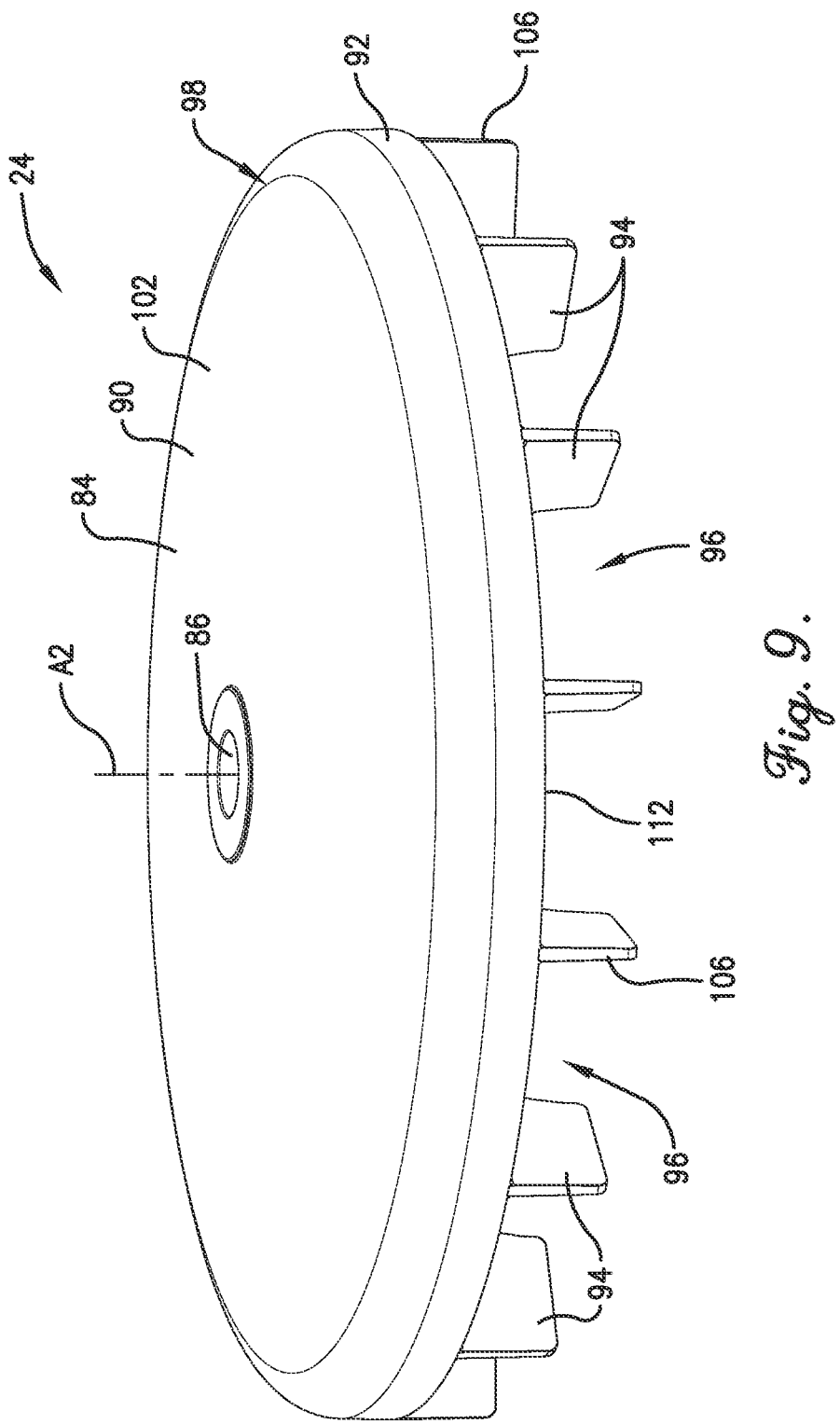
FIG. 9 is an upper perspective of the slinger shown in FIGS. 5-8.

The wheel plate 90 and skirt 92 cooperatively present inner and outer wheel surfaces 100, 102 (see FIGS. 8-10). In the depicted embodiment, the inner wheel surface 100 partly defines the passages 96 and facilitates diversion of liquid in a radially outward direction within the passages 96.

Turning to FIGS. 8-11, the blades 94 partly define the passages 96 and facilitate diversion of liquid in a radially outward direction within the passages 96. The illustrated blades 94 are each unitary and present an inboard end 104, an outboard end 106, and a radially extending blade edge 108 that extends between the ends 104, 106 (see FIG. 8).

The blades 94 preferably comprise a plate-like member having a substantially constant thickness. Furthermore, the depicted blades 94 have a generally flat shape. The flat blade shape permits the slinger 24 to divert liquid outwardly when spun in either direction about the slinger axis A2. For some aspects of the present invention, the blades could also have a curved shape (e.g., to induce a greater flow of liquid).

The blade edges 108 each include an outboard section 108a and a radially inward inboard section 108b (see FIGS. 7 and 8). The outboard section 108a extends axially from the inboard section 108b such that the blade edges 108 cooperatively present a recessed shoulder 110 of the slinger 24 (see FIGS. 7 and 8).

As will be described, at least a portion of the housing 30 is preferably positioned in the recessed shoulder 110, with the outboard sections 108a of the blade edges 108 extending axially along the housing 30 and the inboard sections 108b extending radially along the end face 80.

In the depicted embodiment, the blades 94 extend axially from the wheel plate 90 in a direction toward the housing 30. That is, the blades 94 generally extend from the inner wheel surface 100 toward the housing 30. However, in alternative embodiments, at least part of the blades could extend axially from the wheel plate in a direction away from the housing. Again, the blades 94 cooperate with the wheel plate 90 and the skirt 92 to form the series of passages 96 extending radially outward relative to the shaft opening 78.

As noted above, the illustrated skirt 92 circumscribes and partly covers the outboard ends 106 of the blades 94. In particular, the skirt 92 generally covers a portion of the outboard ends 106 adjacent the inner wheel surface 100. However, the skirt 92 terminates at a skirt edge 112 located between the inner wheel surface 100 and the outboard section 108a. Consequently, part of the outboard ends 106 of the blades 94 is uncovered to form a discharge outlet 114 that fluidly communicates with the passages 96 and permits liquid to flow radially outwardly out of the passages 96.

The depicted configuration of the skirt 92 cooperates with the wheel plate 90 to facilitate the radially outward diversion of liquid. At the same time, as liquid within the passages 96 advances radially outwardly and is discharged out of the outlet 114, the skirt 92 induces the discharged liquid to move axially beyond the end face 80 of the endshield 60.

The radially inboard ends 104 of blades 94 preferably intersect the hub 82. More specifically, in the illustrated embodiment, the radially inboard ends 104 of the blades 94 preferably project radially outward from the outer surface 88 of the sleeve 85. The inboard end 104 of each blade 94 intersects the hub 82 along an intersection region 116. The region 116 has an axial length dimension D2 as measured from the inner plate surface 100 and along the sleeve outer surface 88 (see FIG. 8). The ratio of the axial length dimension D2 to the axial length of the hub 82 preferably ranges from about ten percent (10%) to about one hundred percent (100%) and, more preferably, is about twenty-five percent (25%). The ratio of the axial length dimension D2 to the axial length of the hub 82 is preferably configured so that the slinger 24 has desirable performance characteristics (for example, strength, weight, and/or efficiency).

In the depicted embodiment, the inboard end 104 of each blade 94 diverges away from the end face 80 toward the hub 82, such that the inboard end 104 of each blade 94 axially narrows in a radially inward direction. That is, an inner part of the inboard section 108b generally tapers toward the inner wheel surface 100 in the radially inward direction. The inboard section 108b and the outer surface 88 meet at a vertex 118 (see FIG. 8). Preferably, the vertex 118 has a radius (i.e., the vertex does not comprise a sharp angle). It will be appreciated that the radius of the vertex 118 could be variously sized to provide the slinger 24 with suitable performance characteristics (for example, strength, weight, and/or efficiency).

The slinger 24 preferably comprises a synthetic resin material, such as an elastomeric material. It is equally within the ambit of the present invention where the slinger includes, alternatively or additionally, one or more other materials. For instance, the slinger could include one or more metallic materials (e.g., carbon steel, stainless steel, and/or aluminum).

The illustrated embodiment of the slinger 24 preferably comprises a one-piece construction. However, for some aspects of the present invention, the slinger could include multiple components that are attached to one another (e.g., where the components are welded, adhered, fastened, and/or otherwise secured to one another).

Turning to FIGS. 5-7, the depicted slinger 24 is mounted on the shaft 44 to divert liquid radially away from the shaft opening 78. During operation, as will be discussed further below, the slinger 24 spins with the shaft 44 to restrict liquid from collecting in or adjacent the shaft opening 78 and thereby restricts liquid from migrating into the upper bearing 46, the bearing pocket 72, and/or the motor chamber 66.

When the slinger 24 is secured on the shaft 44, the blades 94 preferably extend radially outwardly beyond the housing 30 so that the outboard ends 106 are spaced radially outward from the housing 30.

Also, the illustrated blade edges 108 extend radially in close proximity along the end face 80, such that the end face 80 facilitates radially outward diversion of liquids within and along the passages 96. In particular, the inboard section 108b of the blade edges are in close proximity to the end face 80.

The inboard section 108b and the end face 80 cooperatively define a minimum spacing dimension D3 (see FIG. 7) to provide optimal clearance between the end face 80 and the blades 94. The motor assembly 20 is preferably configured so that the ratio of spacing dimension D3 to housing diameter dimension D1 ranges from about one-half percent (0.5%) to about ten percent (10%) and, more preferably, is about two percent (2%).

The slinger 24 is also preferably located so that the end face 80 of the endshield 60 is positioned in the recessed shoulder 110 (see FIG. 7). With this positioning of the slinger 24, it will be appreciated that the outboard sections 108a of the blade edges 108 extend axially beyond the end face 80, so that the blades 94 axially overlap the housing 30. That is, at least a portion of the housing 30 is positioned in the recessed shoulder 110, with outboard portions of the blade edges 108 extending axially along the shell 58.

The slinger 24 is preferably positioned and configured so that the blades 94 are spaced laterally outboard from the shell 58. In this preferred embodiment, the recessed shoulder 110 and the shell 58 cooperatively define a gap therebetween with a lateral spacing dimension D4 (see FIG. 7). Unexpectedly, it has been found that this gap between the shoulder 110 and shell 58 facilitates radially outward fluid flow from the passages 96, while promoting turbulent air flow in laterally outboard regions R and a cooling axial fluid flow C along the shell 58 (see FIG. 11).

The slinger 24 is positioned and configured so that the circumferential skirt 92 projects axially from the wheel plate 90 in a direction toward the housing 30. The depicted configuration of the skirt 92 cooperates with the wheel plate 90 and the blades 94 to facilitate the radially outward diversion of fluid. At the same time, as fluid within the passages 96 advances radially outwardly and is discharged out of the outlet 114, the skirt 92 induces the discharged fluid to move axially beyond the end face 80 (see FIG. 11).

Turning to FIG. 11, the illustrated slinger 24 is also preferably configured to promote cooling of the motor 22. The slinger 24 preferably provides such cooling by inducing ambient air flow adjacent the shell 58 of the housing 30. As noted above, the slinger 24 directs fluid within the passages 96 in a radially outward direction and discharges fluid radially outwardly from the outlet 114.

In particular, the slinger 24 is preferably configured so that fluid flow out of the passages 96 preferably moves in a primary flow direction F, which is angularly offset relative to a laterally outward direction at an oblique angle? (see FIG. 11). It has been surprisingly found that the primary flow direction F of discharged fluid flow from the passages 96 induces turbulent air flow in laterally outboard regions R (see FIG. 11). Furthermore, fluid flow in the primary flow direction F has been found to induce the cooling axial fluid flow C along the shell 58.

In the absence of air flow along the shell 58, the shell 58 would inefficiently discharge heat from the motor 22. However, the substantial axial air flow C along the shell 58 increases the amount of heat transferred from the motor 22 by convection. Thus, by inducing the axial air flow along the shell 58, the slinger 24 increases convection heat transfer from the motor 22 and thereby enhances cooling of the motor 22.

In use, the slinger 24 is preferably used as part of the motor assembly 20 to restrict liquid from migrating into the upper bearing 46, the bearing pocket 72, and/or the motor chamber 66. More specifically, as noted above, the slinger 24 spins with the shaft 44 to divert liquid away from the shaft opening 78 and thereby restricts liquid from collecting in or adjacent the shaft opening 78. If the depicted slinger 24 is not used as part of the motor assembly, those of skill in the art will understand that liquid can collect along the endshield 60.

As the slinger 24 and shaft 44 spin about the shaft axis A1, liquid within the passages 96 is urged to move radially outwardly by the slinger 24. It will be appreciated that the blades 94 primarily urge liquid in the passages 96 to move radially outwardly, although the inner wheel surface 100 and the outer surface 88 can also urge radially outward movement of liquid in the passages.

Furthermore, liquid positioned outside of the passages 96 but between the slinger 24 and the endshield 60 can also be urged by the slinger 24 to move radially outwardly as the slinger 24 spins with the shaft 44. For instance, liquid received on one of the blade edges 108 or on the end face 80 would be urged to move outwardly when the slinger 24 spins. It will also be understood that liquid may pass into and/or out of the passages 96 as the liquid advances radially outward from a location between the slinger 24 and endshield 60 to another location further away from the shaft opening 78 (e.g., a location spaced radially outward from the outboard ends 106).

In this manner, the slinger 24 can move liquid radially beyond the outboard ends 106 of the blades 94 to restrict liquid from entering the shaft opening 78, the upper bearing 46, the bearing pocket 72, and/or the motor chamber 66.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. An electric motor comprising:
    a stator;
    a rotor rotatable relative to the stator;
    a housing in which the stator and rotor are at least partly housed,
        said housing presenting a shaft opening and an end face that extends about the shaft opening;
    a rotatable output shaft projecting outwardly through the shaft opening and being associated with the rotor for rotational movement therewith; and
    a slinger fixed relative to the output shaft outside the housing, with the slinger being rotatable with the output shaft to divert liquid radially away from the output shaft and the shaft opening,
    said slinger including a hub adjacent the output shaft and a wheel,
    said wheel including a wheel plate and a plurality of radially extending blades, cooperatively forming a series of passages extending radially outward relative to the shaft opening,
    said blades extending radially outwardly beyond the housing to present respective outboard ends spaced radially outward from the housing,
    said blades presenting radially extending blade edges that extend in close proximity along the end face, such that the end face facilitates radially outward flow along the passages,
    said wheel including a circumferential skirt projecting axially from the wheel plate in a direction toward the housing,
    said skirt covering part of the outboard ends adjacent the wheel plate, with another part of the outboard ends between the skirt and the blade edges being uncovered to form a discharge outlet that fluidly communicates with the passages to permit flow radially outwardly out of the passages.

2. The electric motor as claimed in claim 1,
    said skirt extending axially from the wheel plate to a circumferential skirt edge, with the skirt edge extending continuously along the discharge outlet.

3. The electric motor as claimed in claim 2,
    said skirt edge being axially spaced from the end face.

4. The electric motor as claimed in claim 3,
    said outboard ends extending axially beyond the end face.

5. The electric motor as claimed in claim 1,
    said hub comprising a sleeve that defines a shaft hole,
    said output shaft being received in the shaft hole, with the slinger being fixedly attached to the output shaft, said sleeve including an outer surface, with the radially inboard ends of the blades projecting from the outer surface.

6. The electric motor as claimed in claim 1,
said blade edges each including an outboard section and a radially inward inboard section,
said outboard section extending axially from the inboard section such that the blade edges cooperatively present a recessed shoulder of the slinger, with at least part of the outboard section being axially aligned with said another part of the outboard ends.

7. The electric motor as claimed in claim 6,
said end face of the housing being positioned in the recessed shoulder, with the outboard sections of the blade edges extending axially beyond the end face.

8. The electric motor as claimed in claim 6,
said outboard sections of the blade edges being spaced radially outboard from the housing.

9. The electric motor as claimed in claim 1,
said circumferential skirt interconnecting the outboard ends of the blades.

10. The electric motor as claimed in claim 1,
said blades presenting radially inboard ends that diverge away from the end face toward the hub, such that the inboard end of each blade axially narrows in a radially inward direction.

11. The electric motor as claimed in claim 1,
at least part of said blades extending axially from the wheel plate in a direction toward the housing.

12. The electric motor as claimed in claim 11,
said blade edges extending radially between the hub and the outboard ends.

13. The electric motor as claimed in claim 12,
each of said blade edges including an outboard section and a radially inward inboard section,
said outboard section extending axially from the inboard section such that the blade edges cooperatively present a recessed shoulder of the slinger,
at least a portion of the housing being positioned in the recessed shoulder, with the outboard sections of the blade edges extending axially along the housing.

14. A slinger for an electric motor, wherein the motor includes a housing in which a stator and rotor are at least partly housed, and the motor includes a rotatable output shaft projecting outwardly through a shaft opening in the housing, said housing presenting an end face that extends about the shaft opening, with the output shaft being associated with the rotor for rotational movement therewith, said slinger comprising:
a hub fixedly attachable to the output shaft so that the slinger rotates with the output shaft; and
a wheel configured to divert liquid radially away from the shaft opening,
said wheel including a wheel plate and a plurality of radially extending blades cooperatively forming a series of passages extending radially outward relative to the shaft opening, when the hub is attached to the output shaft,
said blades presenting radially inboard ends intersecting the hub,
said blades configured to extend radially outwardly beyond the housing to present respective outboard ends spaced radially outward from the housing,
said blades presenting radially extending blade edges that extend in close proximity along the end face, such that the end face facilitates radially outward flow along the passages,
said wheel including a circumferential skirt projecting axially from the wheel plate in a direction toward the housing when the slinger is fixed relative to the output shaft,
said skirt covering part of the outboard ends adjacent the wheel plate, with another part of the outboard ends between the skirt and the blade edges being uncovered to form a discharge outlet that fluidly communicates with the passages to permit flow radially outwardly out of the passages.

15. The electric motor as claimed in claim 14,
said skirt extending from the wheel plate to a circumferential skirt edge that extends continuously along the discharge outlet.

16. The slinger as claimed in claim 14,
said hub comprising a sleeve that defines a shaft hole configured to receive the output shaft,
said sleeve including an outer surface, with the radially inboard ends of the blades projecting from the outer surface.

17. The slinger as claimed in claim 16,
said shaft hole extending continuously through the sleeve such that the output shaft is configured to extend entire through the shaft hole when the hub is attached to the output shaft.

18. The slinger as claimed in claim 15,
said blades presenting radially extending blade edges that each include an outboard section and a radially inward inboard section,
said outboard section extending axially from the inboard section such that the blade edges cooperatively present a recessed shoulder of the slinger configured to receive a portion of the housing therein.

19. The slinger as claimed in claim 18,
said circumferential skirt interconnecting the outboard ends of the blades.

20. The slinger as claimed in claim 15,
said inboard end of each blade axially narrowing in a radially inward direction toward the hub.

* * * * *